United States Patent [19]

Sandiford et al.

[11] Patent Number: 5,486,312
[45] Date of Patent: Jan. 23, 1996

[54] HIGH TEMPERATURE STABLE GELS

[75] Inventors: Burton B. Sandiford, Balboa Island; Hoai T. Dovan, Yorba Linda; Richard D. Hutchins, Placentia, all of Calif.

[73] Assignee: Union Oil Company of California, Los Angeles, Calif.

[21] Appl. No.: 119,715

[22] Filed: Sep. 10, 1993

Related U.S. Application Data

[62] Division of Ser. No. 940,301, Aug. 31, 1992, Pat. No. 5,246,073.

[51] Int. Cl.$^6$ .............................. B01J 13/00; C08F 8/32; C09K 3/00
[52] U.S. Cl. .................. 252/315.1; 252/307; 252/315.4; 507/225; 507/903; 524/916; 525/327.6; 525/329.4; 526/932
[58] Field of Search .......................... 252/8.551, 8.554, 252/307, 315.1, 315.4, 183.11, 183.12; 525/329.4, 327.6; 524/916; 526/932; 204/182.8; 507/903, 120, 225; 544/185; 528/129

[56] References Cited

U.S. PATENT DOCUMENTS

| | | | |
|---|---|---|---|
| 3,511,789 | 5/1970 | Shannon et al. | 528/129 X |
| 3,929,695 | 12/1975 | Murata et al. | 528/129 X |
| 3,959,569 | 5/1976 | Burkholder, Jr. | 428/475 |
| 4,137,182 | 1/1979 | Golinkin | 252/8.551 |
| 4,246,124 | 1/1981 | Swanson | 252/8.551 |
| 4,300,634 | 11/1981 | Clampitt | 166/295 X |
| 4,389,320 | 6/1983 | Clampitt | 252/8.551 |
| 4,428,432 | 1/1984 | Pabley | 166/307 X |
| 4,440,228 | 4/1984 | Swanson | 166/274 |
| 4,514,309 | 4/1985 | Wadhwa | 252/8.551 |
| 4,553,601 | 11/1985 | Almond et al. | 252/8.551 |
| 4,579,670 | 4/1986 | Payne | 252/8.551 |
| 4,606,772 | 8/1986 | Almond et al. | 525/329.4 X |
| 4,619,776 | 10/1986 | Mondshine | 252/8.551 |
| 4,654,132 | 3/1987 | Takagi et al. | 204/182.8 X |
| 4,776,398 | 10/1988 | Chu et al. | 166/274 |
| 4,779,680 | 10/1988 | Sydansk | 252/8.551 X |
| 4,801,389 | 1/1989 | Brannon et al. | 252/8.551 |
| 4,811,787 | 3/1989 | Navratil et al. | 166/273 |
| 4,896,723 | 1/1990 | Hoskin et al. | 166/272 |
| 4,907,656 | 3/1990 | Sanchez et al. | 166/270 |
| 4,926,943 | 5/1990 | Hoskin | 166/270 |
| 4,928,766 | 5/1990 | Hoskin | 166/270 |
| 4,942,217 | 7/1990 | Gardziella et al. | 528/129 |
| 5,071,890 | 12/1991 | Shu et al. | 523/130 |
| 5,079,278 | 1/1992 | Mitchell | 523/130 |
| 5,145,012 | 9/1992 | Hutchins et al. | 166/292 |
| 5,145,913 | 9/1992 | Gerber | 528/129 X |
| 5,160,445 | 11/1992 | Sharif | 252/8.551 |
| 5,246,073 | 9/1993 | Sandiford et al. | 166/295 |
| 5,399,269 | 3/1995 | Moradi-Araghi | 507/225 X |

FOREIGN PATENT DOCUMENTS

| | | |
|---|---|---|
| 0139471 | 5/1985 | European Pat. Off. ............ 204/182.8 |
| 0446865 | 3/1991 | European Pat. Off. . |
| 0447967 | 3/1991 | European Pat. Off. . |

OTHER PUBLICATIONS

SPE 11787.
SPE DOE 17329.
SPE 18500.

Primary Examiner—Richard D. Lovering
Attorney, Agent, or Firm—Gregory F. Wirzbicki; Shlomo R. Frieman

[57] ABSTRACT

Gels stable in a subterranean formation at a temperature greater than about 175° F. are formed using, inter alia, a stabilizing agent (e.g., a buffer having a buffering capacity at a pH of at least about 8 and/or a chelating agent).

58 Claims, No Drawings

HIGH TEMPERATURE STABLE GELS

This application is a division of application Ser. No. 07/940,301, filed Aug. 31, 1992, now U.S. Pat. No. 5,246,073.

BACKGROUND

The present invention relates to (a) methods for forming gels that are stable in a high temperature subterranean formation, (b) high temperature subterranean formations containing the stable gel, and (c) high temperature stable gels.

More and more wells are being drilled into subterranean formations which are at temperatures greater than about 175° F. This phenomenon is due to (a) the increasing depth to which wells are drilled to penetrate oil- and gas-bearing subterranean formations and (b) the drilling of wells in regions having shallow, high temperature, oil- and/or gas-bearing or geothermal subterranean formations, e.g., the Pacific Rim and the North Sea.

While hard water-containing gels are suitable for use (e.g., in enhanced oil and gas operations) in low temperature formations, they are unsuitable for use in subterranean formations at a temperature greater than about 175° F. due to gel degradation (e.g., syneresis and polymer precipitation). (As used in the specification and claims, the term "hard water" means an aqueous liquid having a total divalent cation content of at least about 80 parts per million by weight (ppmw).) Accordingly, one current practice is to import soft water (e.g., surface water, potable water) to the drilling site at considerable expense. (As used in the specification and claims, the term "soft water" means an aqueous liquid having a total divalent cation content of less than about 75 ppmw.) Another current practice is to use more expensive polymer systems that allegedly are capable of forming hard water-containing gels stable at temperatures up to about 250° F.

In addition, even when soft water is used for forming gels to be employed in subterranean formations at temperatures above about 175° F., soft water-containing gels tend to gradually degrade when contacted by hard water (e.g., brine) that is prevalent in many subterranean formations.

SUMMARY OF THE INVENTION

Accordingly, there is a need for a method for forming low cost, hard water-containing gels which are stable at subterranean temperatures above about 175° F. There is also a need for a method for preventing the degradation of soft water-containing gels When contacted by hard water in subterranean formations at temperatures greater than about 175° F.

The present invention satisfies both needs by providing methods that employ either (a) hard water-containing gels which are stable at temperatures above about 175° F. (and, in fact, at temperatures above about 350° F.) or (b) soft water-containing gels which are stable at temperatures above about 175° F. when contacted by hard water. Both of these methods are capable of using conventional, low cost polymers to form the gel. In one version, the method comprises the steps of injecting into at least a portion of a subterranean formation at a temperature of at least about 175° F. (i) a composition comprising (a) an ingredient selected from the group consisting of water soluble, crosslinkable polymers and polymerizable monomers capable of forming a crosslinkable polymer and (b) hard or soft water, (ii) a crosslinking agent, and (iii) a stabilizing agent capable of preventing the degradation of ($\alpha$) a hard water-containing gel maintained at a temperature of about 175° F. or more or ($\beta$) a soft water-containing gel maintained at a temperature of about 175° F. or more in the presence of hard water.

Another version of the invention entails the step of injecting, into at least a portion of a subterranean formation at a temperature of at least about 175° F., a composition comprising (i) the ingredient capable of forming a crosslinkable polymer, (ii) the crosslinking agent, (iii) the hard or soft water, and (iv) the stabilizing agent.

In yet another version, a gas and a composition comprising (i) the ingredient capable of forming a crosslinkable polymer, (ii) the crosslinking agent, (iii) the hard or soft water, (iv) the stabilizing agent, and (v) a surfactant are injected into at least a portion of a subterranean formation at a temperature greater than about 175° F. to form a stable, foamed gel.

The present invention also provides a recovery system, a gel, and a high temperature stable, gel-forming composition. The recovery system comprises (i) a subterranean formation at a temperature of at least about 175° F., (ii) a well penetrating at least a portion of the subterranean formation, and (iii) a gel formed by any of the above versions of the invention present in at least a portion of the subterranean formation.

With respect to the gels, in one embodiment of the invention, the gel is at a temperature of at least about 175° F. and comprises (i) a crosslinked polymer, (ii) the hard or soft water, and (iii) the stabilizing agent. In another invention embodiment, the gel comprises (i) a polymer crosslinked by an organic crosslinking agent, (ii) the hard or soft water, and (iii) a chelating agent (i.e., a class of stabilizing agents).

Concerning the gel-forming composition, in one version the composition comprises (i) the ingredient capable of forming a crosslinkable polymer, (ii) hexamethylenetetramine, (iii) the hard or soft water, and (iv) the stabilizing agent. Another gel-forming composition within the scope of the invention comprises (i) the ingredient capable of forming a crosslinkable polymer, (ii) an organic crosslinking agent, (iii) the hard or soft water, and (iv) the chelating agent.

DETAILED DESCRIPTION OF THE INVENTION

Virtually any of the many gel-forming ingredients used by those skilled in the art to treat subterranean formations can be employed in the present invention. Exemplary crosslinked polymer forming ingredients employed in making gels include, but are not limited to, those discussed in U.S. Pat. Nos. 3,306,870, 3,727,687, 3,740,360, 3,749,172, 3,749,174, 3,782,467, 3,785,437, 3,818,998, 3,881,552, 3,897,827, 3,908,760, 3,921,733, 3,926,258, 3,971,440, 3,978,928, 4,018,286, 4,040,484, 4,074,757, 4,110,230, 4,290,485, 4,413,680, 4,460,751, 4,464,270, 4,470,915, 4,494,606, 4,498,539, 4,502,967, 4,534,412, 4,572,295, 4,579,670, 4,643,255, 4,664,194, 4,667,032, 4,683,949, 4,694,906, 4,776,398, 4,779,680, 4,787,451, 4,796,700, 4,821,802, 4,896,723, SPE 18201, and SPE 3992, these documents being incorporated herein in their entirety by reference.

A crosslinked polymer is generally formed by reacting or contacting proper proportions of a crosslinkable polymer with a crosslinking agent. However, the gel-forming composition need only contain either the crosslinkable polymer or the crosslinking agent. When the crosslinkable polymer or crosslinking agent is omitted from the composition, the omitted material is usually introduced into the subterranean formation as a separate slug, either before, after, or simultaneously with the introduction of the gel-forming composition. Preferably, the composition comprises at least the crosslinkable polymer or monomers capable of polymerizing to form a crosslinkable polymer (e.g., acrylamide, vinyl acetate, acrylic acid, vinyl alcohol, methacrylamide, ethylene oxide, and propylene oxide). More preferably, the composition comprises both (a) the crosslinking agent and (b) either (i) the crosslinkable polymer or (ii) the polymerizable monomers capable of forming a crosslinkable polymer.

Typically, the crosslinkable polymer is water soluble. Common classes of water soluble crosslinkable polymers include polyvinyl polymers, polymethacrylamides, cellulose ethers, polysaccharides, lignosulfonates, ammonium salts thereof, as well as alkaline earth salts of lignosulfonates. Specific examples of typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), and ammonium and alkali metal salts thereof. Preferred water soluble crosslinkable polymers include hydroxypropyl guar, partially hydrolyzed polyacrylamides, xanthan gum, polyvinyl alcohol, and the ammonium and alkali metal salts thereof.

The crosslinkable polymer is available in several forms such as a water solution or broth, a gel log solution, a dried powder, and a hydrocarbon emulsion or dispersion. As is well known to those skilled in the art, different types of equipment are employed to handle these different forms of crosslinkable polymers.

With respect to crosslinking agents, these agents are organic and inorganic compounds well known to those skilled in the art. Exemplary organic crosslinking agents include, but are not limited to, aldehydes, dialdehydes, phenols, substituted phenols, and ethers. Phenol, resorcinol, catechol, phloroglucinol, gallic acid, pyrogallol, 4,4'-diphenol, 1,3-dihydroxynaphthalene, 1,4-benzoquinone, hydroquinone, quinhydrone, tannin, phenyl acetate, phenyl benzoate, 1-naphthyl acetate, 2-naphthyl acetate, phenyl chloroacetate, hydroxyphenylalkanols, formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, hexamethylenetetramine, trioxane, tetraoxane, polyoxymethylene, and divinylether are some of the more typical organic crosslinking agents. Typical inorganic crosslinking agents are polyvalent metals, chelated polyvalent metals, and compounds capable of yielding polyvalent metals. Some of the more common inorganic crosslinking agents include chromium salts, aluminates, gallates, titanium chelates, aluminum citrate, chromium citrate, chromium acetate, chromium propionate, and zirconium chelates or complexes. Individual or mixtures of crosslinking agents are used in the present.

Also employed in the present invention is a stabilizing agent capable of preventing the degradation of the hard water-containing gel at a temperature above at least about 175° F. These stabilizing agents are also capable of preventing the degradation of the soft-water-containing gels in the presence of hard water at a temperature greater than about 175° F. The stabilizing agent is preferably capable of preventing such degradation at subterranean temperatures above at least about 200°, more preferably at least about 225°, and most preferably at least about 250° F. In fact, the stabilizing agent is also capable of preventing gel degradation at higher subterranean temperatures, such as at least about 275°, about 300°, about 325°, and even about 350° F.

An exemplary class of stabilizing agents is buffering agents having a buffering capacity at a pH of at least about 8. Preferably, the buffering agents have a buffering capacity at a pH of at least about 8.1, more preferably at least about 8.2, even more preferably at least 8.3, and most preferably at least 8.4. Some buffering agents employed in the invention have buffering capacities at pH's of at least about 8.5, about 8.75, about 9, about 9.25, about 9.5, about 9.75, about 10, about 10.25, about 10.5, about 10.75, and even about 11.

Typical buffering agents include, but are not limited to water-soluble bicarbonate salts, carbonate salts, phosphate salts, and mixtures thereof. Preferably, the buffering agent is selected from the group consisting of the ammonium and alkali metal salts of bicarbonate, carbonate, dibasic phosphate, tribasic phosphate, and mixtures thereof. More preferably, the buffering agent is selected from the group consisting of the ammonium and alkali metal salts of bicarbonate and carbonate, with the ammonium, sodium, and potassium salts of bicarbonate and carbonate being the most preferred buffering agents.

Another class of stabilizing agents is chelating agents. Exemplary types of chelating agents include, but are not limited to, polyphosphates (e.g., sodium tripolyphosphate, hexametaphosphoric acid), aminocarboxylic acids (e.g., ethylenediaminetetraacetic acid (EDTA), N-(hydroxyethyl) ethylenediaminetetraacetic acid (HEDTA), nitrilotriacetic acid (NTA), diethylenetriaminepentaacetic acid (DTPA), N-dihydroxyethylglycine, ethylenebis(hydroxyphenylglycine), 1,3-diketones (e.g., acetylacetone, trifluoroacetylacetone, thenoyltrifluoroacetone), hydroxycarboxylic acids (e.g., tartaric acid, citric acid, gluconic acid, 5-sulfosalicylic acid), polyamines (e.g., ethylenediamine, triethylenetetramine, triaminotriethylamine), aminoalcohols (e.g., triethanolamine, N-hydroxyethylethylenediamine), aromatic heterocyclic bases (e.g., dipyridyl, o-phenanthroline), phenols (e.g., salicylaldehyde, disulfopyrocatechol, chromotropic acid), aminophenols (e.g., oxine, 8-hydroxyquinoline, oxinesulfonic acid), oximes (e.g., dimethylglyoxime, salicylaldoxime), schiff bases (e.g., disalicylaldehyde 1,2-propylenediimine), tetrapyrroles (e.g., tetraphenylporphin, phthalocyanine), sulfur compounds (e.g., toluenedithiol, dimercaptopropanol, thioglycolic acid, potassium ethyl xanthate, sodium diethyldithiocarbamate, dithizone, diethyl dithiophosphoric acid, thiourea), polymeric (e.g., polyethylenimine, polymethacryloylacetone, poly(p-vinylbenzyliminodiacetic acid), and phosphonic acids (e.g., nitrilomethylenephosphonic acid, ethylenediaminetetra(methylenephosphonic acid), hydroxyethylidenediphosphonic acid).

Optionally, surfactants are employed in practicing the present invention. Preferred surfactants are water-soluble and have sufficient foaming ability to enable the composition, when traversed by a gas, to foam and, upon curing, form a foamed gel. Non-limiting examples of the preferred surfactants are those which, when incorporated into water in a concentration of about 5 weight percent or less (based on the total weight of water and surfactant), meet the following described test. The surfactant is dissolved in water and about 500 ml of the resulting solution is placed in a graduated cylinder to form a column having a height of about 50 cm. Natural gas is passed into the bottom of the column through a fritted glass disc at substantially atmospheric pressure so that the gas bubbles through the column of liquid and passes out the top of the cylinder. The gas rate is maintained at about 500 ml gas per minute per square inch of column cross-sectional area, and the flow of the gas is continued for a period of about 15 minutes. The preferred surfactants produce a column of foam at least about 180 cm in height under these conditions at the top of the column of water.

Exemplary surfactants include, but are not limited to, alkyl polyethylene oxide sulfates (e.g., ALIPAL CD 128 brand surfactant), alkyl alkylolamine sulfates, modified ether alcohol sulfate sodium salt, sodium lauryl sulfate, perfluoroalkanoic acids and salts having about 3 to about 24 carbon atoms per molecule (e.g., perfluorooctanoic acid, perfluoropropanoic acid, and perfluorononanoic acid), modified fatty alkylolamides, polyoxyethylene alkyl aryl ethers, octylphenoxyethanol, ethanolated alkyl quanidine-amine complexes, condensation of hydrogenated tallow amide and ethylene oxide, ethylene cyclomido 1-lauryl, 2-hydroxy, ethylene sodium alcoholate, methylene sodium carboxylate, alkyl arylsulfonates, sodium alkyl naphthalene sulfonate, sodium hydrocarbon sulfonates, petroleum sulfonates, sodium linear alkyl aryl sulfonates, alpha olefin sulfonates, condensation product of propylene oxide with ethylene oxide, sodium salt of sulfated fatty alcohols, octylphenoxy polyethoxy ethanol, sorbitan monolaurate, sorbitan monopalmitate, sorbitan trioleate, polyoxyethylene sorbitan tristearate, polyoxyethylene sorbitan tristearate, polyoxyethylene sorbitan monooleate, dioctyl sodium sulfosuccinate, modified phthalic glycerol alkyl resin, octylphenoxy polyethoxy ethanol, acetylphenoxy polyethoxy ethanol, dimethyl didodecenyl ammonium chloride, methyl trioctenyl ammonium iodide, trimethyl decenyl ammonium chloride, dibutyl dihexadecenyl ammonium chloride, and water-soluble salts of esters of $C_3$ to $C_6$ sulfodicarboxylic acids having the general formula

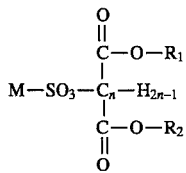

where M is selected from the group consisting of alkali metals, ammonium, and substituted ammonium; $R_1$ and $R_2$ are each independently an alkyl group containing about 3 to about 16 carbon atoms, and n is an integer from 1 to about 4.

The total divalent cation content of the hard water employed in the present invention is generally at least about 100 ppmw. Hard water having an even higher total divalent cation concentration (e.g., about 250, 500, 1,000, 5,000, 10,000, 15,000, 20,000, or more ppmw) may also be employed in the invention. Exemplary types of hard waters include, but are not limited to, sea water (typically having a total divalent cation concentration of about 1,000 to about 1,500 ppmw), water produced from oil and gas fields (usually having a total divalent cation concentration of about 100 to about 20,000 ppmw), and geothermal brines (often having a total divalent cation concentration of about 100 to about 30,000 ppmw). Calcium, magnesium, strontium, and barium are the divalent cations commonly prevalent in hard water, with calcium and magnesium being typically the most prevalent.

In the soft water embodiment of the invention, the soft water commonly has a total divalent cation concentration less than about 50 ppmw or even lower (e.g., less than about 25 ppmw).

Techniques for forming gelable compositions and conditions under which such compositions form gels in subterranean formations are well known to those skilled in the art, are discussed in the above incorporated documents. Such techniques need not be elaborated upon herein. In general, the gel-forming compositions are formed by mixing, in the hard or soft water, the polymer, the crosslinking agent, the stabilizing agent, and, optionally, the surfactant.

As known to those skilled in the art, the exact polymer and crosslinking agent concentrations are selected to assure (a) gel stability at reservoir (i.e., subterranean) conditions and (b) a suitable time frame for injecting the composition prior to gelation. The polymer is generally employed in a concentration of about 0.05 to about 50 weight percent, with polymer concentrations of about 0.1 to about 10 weight percent being preferred, about 0.2 to about 5 weight percent being more preferred, and about 0.25 to about 2.5 weight percent being most preferred. (Unless otherwise indicated, as used in the specification and claims, the term "weight percent" means the weight of a particular ingredient (e.g., polymer, crosslinking agent, stabilizing agent, and surfactant) divided by the total weight of all ingredients present in the gel-forming composition.) Typically, the crosslinking agent is employed in a concentration of about 0.001 to about 2, preferably about 0.005 to about 1, more preferably about 0.0075 to about 0.5, and most preferably about 0.01 to about 0.1, weight percent.

With respect to the stabilizing agent, the stabilizing agent is generally employed in a sufficient concentration to increase the stability of the gel (in comparison to a gel containing identical ingredients but devoid of the stabilizing agent) at the temperature of the subterranean formation (and, in the case of a soft water-containing gel, in the presence of a hard water) by at least about one day, preferably by at least about one week, more preferably by at least about one month, and most preferably by at least about one year.

When the stabilizing agent is the buffering agent, the buffering agent is usually present in the gel-forming compositions in a concentration of at least about 0.05, preferably at least about 0.75, more preferably at least about 1, and most preferably at least about 1.5, weight percent. Generally, the buffering agent is present in the gel-forming composition in a concentration of less than about 20, preferably less than about 10, more preferably less than about 5, and most preferably less than about 2.5 weight percent.

In those instances when the stabilizing agent is a chelating agent, the chelating agent is generally employed in the composition in a concentration of at least about 0.75 mole per mole of dissolved divalent cations present in the hard water employed in making the composition. When a soft water is used in making the gel-forming composition, the chelating agent is usually employed in the gel-forming composition in a concentration of at least about 0.75 mole per mole of dissolved divalent cations present in the hard water located in the subterranean formation where the gel will be formed. Preferably, the ratio of the moles of the chelating agent employed in the gel-forming composition to the moles of the dissolved divalent cation is about 0.75:1 to about 10:1, more preferably about 0.8:1 to about 5:1, even more preferably about 0.9:1 to about 2:1, and most preferably about 0.9:1 to about 1.5:1. While a ratio of about 10 moles chelating agent per mole dissolved divalent cation can be employed in the invention, there does not appear to be any significant advantage to employing a ratio greater than about 1:1.

In those instances where the chelating agent is used, the pH of the water employed to formulate the gel-forming compositions is preferably at least about 6.5, more preferably at least about 7, even more preferably at least about 7.5, and most preferably at least about 8. Since most waters employed in preparing gel-forming compositions have a pH of at least about 6.5, there is generally no need to modify the pH of such water. Nevertheless, in those instances where it is desirable or necessary to raise the pH of the water, any organic or inorganic base can be employed. In addition, one or more chelating agents can be used in conjunction with one or more of the above-described buffering agents.

In some cases (e.g., when phenolic chelating agents are employed), the chelating agent is capable of also functioning as a crosslinking agent. If no other crosslinking agent is present, the concentration of the dual acting substance falls within a range equal to the sum of the above-stated concentration ranges for the crosslinking agent and chelating agent. However, when a crosslinking agent is present that is not a chelating agent, the crosslinking agent is preferably present in the above-described crosslinking agent concentration ranges and the dual acting chelating agent is preferably present in the above-noted chelating agent concentration ranges. In those instances where a crosslinking agent is present in a concentration less than about 0.001 weight percent, then the concentration of the dual acting chelating agent in the gel-forming composition is preferably at least about 1 mole per mole of dissolved divalent cations present in the water employed in making the composition.

The above-described buffering and chelating agents are optionally employed in combination, with each agent generally being used within its aforementioned respective range.

When employed, the surfactant is typically used in a concentration up to about 10, preferably about 0.01 to about 5, more preferably about 0.05 to about 3, and most preferably about 0.1 to about 2 weight percent. To avoid prematurely foaming the composition, the surfactant is preferably added to the composition on the fly, i.e., as the composition is being injected into a subterranean formation.

When separate slugs of the crosslinkable polymer, the crosslinking agent, the stabilizing agent, and/or the surfactant are injected into the subterranean formation, the amount of each of these injected ingredients is generally sufficient for their respective concentrations in the combined weight of the injected slugs (including the weight of any intervening spacer slugs) to fall within the above-stated concentration ranges.

While the separate slugs are injectable in any order, it is preferred that (a) a slug containing the polymer and water and a slug containing the stabilizing agent or (b) a slug comprising the polymer, water, and the stabilizing agent be injected prior to injecting a crosslinking agent-containing slug. In addition, each slug is injectable as a single unit or injectable as a plurality of miniunits having substantially the same make-up.

Furthermore, it is preferred to inject a preflush fluid prior to injecting the slug or slugs that constitute the gel-forming composition. The volume of preflush fluid injected is generally about 5 to about 10 volume percent of the total volume of injected material constituting the gel-forming composition. The preflush fluid typically comprises a crosslinking agent and water, the concentration of the crosslinking agent in the preflush fluid being roughly about double the concentration of the crosslinking agent in the gel-forming composition. Optionally, the preflush fluid also contains a stabilizing agent. When employed, the concentration of the stabilizing agent in the preflush fluid is approximately the same as the concentration of the stabilizing agent in the gel-forming composition. (The preflush fluid is not considered part of the gel-forming composition and is, therefore, not included in calculating the volume of material which constitute the gel-forming composition. Similarly, the amount of each ingredient (e.g., crosslinking agent and stabilizing agent) present in the preflush fluid is not included in calculating the concentration of the respective ingredient in the gel-forming composition.)

When a surfactant is employed in the process of the present invention, one or more slugs of a gas are also injected into the subterranean formation. While the gas slugs are injectable before, during, or after the injection of the gel-forming composition or separate slugs constituting the gel-forming composition, it is preferred to inject at least some, and more preferentially all, of the gas slugs after or simultaneously during the injection of the composition. Also preferred is the alternate, sequential injection of one or more slugs of the gel-forming composition and one or more slugs of the gas. The gas slugs are injected into the composition during the gelation period and before the composition has formed a gel incapable of being penetrated by the gas at normal gas injection pressures. Normal gas injection pressures are injection pressures less than the formation fracturing pressure. The gas slugs foam the surfactant-containing composition so that a foamed gel is produced.

The amount of gas injected (when measured at the temperature and pressure conditions in the subterranean formation being treated) is generally about 1 to about 99 volume percent based upon the total volume of treatment fluids injected into the subterranean formation (i.e., the sum of the volume of injected gas plus the volume of injected foamable, gel-forming composition). Preferably, the amount of gas injected is about 20 to about 98, and more preferably about 40 to about 95, volume percent based upon the total volume of injected treatment fluids.

The injected gas is usually a noncondensable gas. Exemplary noncondensable gases include air, oxygen, hydrogen, noble gases (helium, neon, argon, krypton, xenon, and radon), natural gas, hydrocarbon gases (e.g., methane, ethane), nitrogen, and carbon dioxide. Air, nitrogen, and carbon dioxide are the more preferred noncondensable gases, with nitrogen being the most preferred.

One exemplary process for practicing the present invention is as follows. Before mixing any chemicals into the water employed in making the gel-forming composition, the water is generally filtered to prevent any suspended solids from damaging the formation by plugging the wellbore. Typically, the first chemicals added to the water are any required salts such as potassium chloride and the buffering agent (e.g., potassium or ammonium bicarbonate) and/or the chelating agent (e.g., EDTA). The potassium chloride is generally employed to prevent clay problems in the formation. While potassium chloride also helps stabilize the gel at low temperatures (e.g., at a temperature less than about 150° F.), it is ineffective for stabilizing gels at temperatures above about 175° F.

In order for the polymer to experience a high degree of turbulence during the initial mixing stage, solid polymers and liquid-based polymers are usually added to the water through an eductor or a positive displacement pump, respectively. The polymer and water are typically mixed in a mixing tank in small 10 to 25 barrel batches. When desired, further mixing is achieved using either centrifugal pumps or other forms of agitation.

Frequently, the last chemical to be added to the mixing tank is the crosslinking agent (e.g., aluminate or chromium acetate). When used in a solid form, the crosslinking agent is commonly first dissolved in water in order for it to more readily mix with the contents of the mixing tank. This is especially important when the contents of the mixing tank are very viscous.

The gel-forming composition is obtained when all the desired ingredients have been mixed in the mixing tank. (In view of the concentrations ranges of the various ingredients (e.g., polymer, crosslinking agent, buffering agents, etc.) employed in formulating the gel-forming composition, the concentration of water in the composition can vary and be, for example, at least about 68, 73, 78, 83, 88, or 94 weight percent.) The resulting gel-forming composition is then often injected into the subterranean formation through a production well at a pressure below the fracture pressure of the formation. Depending on the injection capabilities of the well, the first slug of the gel-forming composition generally varies from about 50 to about 500 barrels.

The manner in which a non-foaming gel-forming composition is injected into a well typically depends on whether the well penetrates a gas-producing formation or an oil-producing formation. In the case of an oil well, a single slug of the non-foaming gel-forming composition is generally injected. In contrast, alternate slugs of the non-foaming gel-forming composition are usually injected into a gas well, with the alternating slug commonly being a noncondensable gas.

When a foamed gel is desired, the surfactant is preferably added to the gel-forming composition on the fly, i.e., as the composition is being injected into the subterranean formation. (Introducing the surfactant into the composition on the fly avoids foaming the composition in the mixing tank.) Next, the injection of the foamable gel-forming composition is stopped, and a noncondensable gas such as nitrogen is injected into the production well to foam the gel-forming composition. The volume of the nitrogen slug (based upon the temperature and pressure conditions within the formation being treated) is typically about 100 to about 1,000 percent of the volume of the previously injected slug of foamable gel-forming composition volume. The alternating slugs of foamable gel-forming composition and nitrogen are then repeated to achieve the desired penetration depth into the formation as well as the desired degree of foam quality. (The resulting foamed gel usually has a foam quality of at least about 50 volume percent, preferably about 70 to about 99 volume percent, more preferably about 80 to about 99 volume percent, and most preferably about 90 to about 98 volume percent. As used in the specification and claims, the foam quality is the volume of gas bubbles present in the foamed gel divided by the entire volume of the foamed gel.) The volume of the final nitrogen slug is preferably large enough to over-displace the wellbore of any foamable, gel-forming composition.

The gel-forming composition is displaced into the formation a sufficient distance so that at least a portion of the pore space in the formation, typically at least about 3 feet from the production well or point of injection, is occupied by the composition. (When an oil well is being treated with a non-foaming gel-forming composition, the composition is usually displaced with an oil (e.g., crude oil, mineral oil, diesel oil, as well as oil produced from the subterranean formation being treated). In those instances where a gas well is being treated or where a foaming gel-forming composition is being used, the composition is typically displaced into the formation with a noncondensable gas.) Preferably, the gel-forming composition occupies at least a portion of the pores located at least about 15 feet from the well. More preferably, at least some of the pores located at least about 30 feet from the production well contain the composition.

The well is then shut in for a sufficient period of time to allow the gel-forming composition within the pores of the subterranean formation to gel. Next, the well is slowly put back on production following the shut in period.

EXAMPLES

The following comparative examples demonstrate the improve efficacy of exemplary gels formed in accordance with the present invention. In particular, in Examples 1–8 exemplary hard water-containing gel-forming compositions comprising a buffering agent having a buffering capacity at a pH above about 8 are prepared. Gel-forming compositions devoid of any added buffering agent are prepared in Examples 9–18. These compositions are then aged at 300° F. in Examples 19–36. The data obtained from the comparative aging tests are set forth in Table IV and show that hard water-containing gels, which also comprise a buffering agent having a buffering capacity at a pH above about 8, are more stable at high temperatures than similar hard water-containing gels devoid of the buffering agent.

In addition, hard water-containing gel-forming compositions containing chelating agent concentrations within the scope of the invention are prepared in Examples 37–38. Similar gels having chelating agent concentrations less than the minimum required by the invention are prepared in Examples 39–42. The chelating agent-containing compositions are then aged at 300° F. in Examples 43–48. The data obtained from the comparative aging tests are set forth in Table VII and indicate that hard water-containing gels, which also comprise a chelating agent concentration within the scope of the invention, are more stable at an elevated temperature than gels differing solely in that they contain a chelating agent concentration outside the scope of the invention.

The examples within the scope of the present invention are intended to illustrate, and not limit, the invention.

EXAMPLES 1–8

Preparation of Buffering Agent-Containing Gel-Forming Compositions

A. Preparation of Stock Solutions

Stock solutions (about 10 weight percent) were prepared of catechol, phenol, hydroquinone, resorcinol, hexamethylenetetramine, and formaldehyde. In the case of catechol, phenol, hydroquinone, and hexamethylenetetramine, individual stock solutions of each were prepared by adding about 1 g of the respective substance to about 9 g distilled water. For resorcinol, about 4 g of a 25% resorcinol solution were added to about 6 g distilled water and, for formaldehyde, about 2.7 g of a 37% formaldehyde solution were added to about 7.3 g distilled water.

A polyacrylamide stock solution was prepared by dissolving ORP-750 brand polyacrylamide (about 2 g) in about 198 ml seawater at room temperature with stirring. (ORP-750 is a low hydrolysis (<3 mole %) polyacrylamide of about 15 million viscosity average molecular weight available from Dai-Ichi Kogyo Seiyaku Co., LTD. of Japan.)

B. Preparation of Gel-forming Compositions

An aliquot (about 10 g) of the polyacrylamide stock solution was added to each of eight vials. The amount of each ingredient listed in the following Table I for the respective test was then added to each of the vials with shaking. The ingredients were added in the order shown in Table I (proceeding from left to right).

TABLE I

| Ex | Bicarb[a], g | Aromatic[b], ml | HMT[c], ml | HCHO, ml |
|---|---|---|---|---|
| 1 | 2.0 | 0.2 C | — | 0.05 |
| 2 | 2.0 | 0.2 C | 0.05 | — |
| 3 | 2.0 | 0.2 P | — | 0.05 |
| 4 | 2.0 | 0.2 P | 0.05 | — |
| 5 | 2.0 | 0.2 H | — | 0.05 |
| 6 | 2.0 | 0.2 H | 0.05 | — |
| 7 | 2.0 | 0.2 R | — | 0.05 |
| 8 | 2.0 | 0.2 R | 0.05 | — |

[a] "Bicarb" denotes potassium bicarbonate.
[b] "C" denotes catechol; "P" denotes phenol; "H" denotes hydroquinone; and "R" denotes resorcinol.
[c] "HMT" denotes hexamethylenetetramine.

After preparing the gel-forming compositions, the oxygen in the air space of each vial was removed by purging the air space with nitrogen and the vials were then capped.

EXAMPLES 9–8

Preparation of Gel-forming Compositions Devoid of Added Buffering Agent

A. Preparation of Stock Solutions

The catechol, phenol, hydroquinone, resorcinol, hexamethylenetetramine, and formaldehyde stock solutions prepared in Examples 1–8 were also employed in Examples 9–18. The polyacrylamide stock solution used in Examples 9–18 was prepared by dissolving ORP-750 brand polyacrylamide (about 2 g) in about 198 ml seawater at room temperature with stirring. No buffering agent was added to this polyacrylamide stock solution.

B. Preparation of Gel-forming Compositions

An aliquot (about 10 g) of the polyacrylamide stock solution prepared in preceding section A was added to each of ten vials. The amount of each ingredient listed in the following Table II for the respective test was then added to each of the vials with shaking. The ingredients were added in the order shown in Table II (proceeding from left to right).

TABLE II

| Ex | Bicarb[a], g | Aromatic[b], ml | HMT[c], ml | HCHO, ml |
|---|---|---|---|---|
| 9 | — | 0.2 C | 0.05 | — |
| 10 | — | 0.2 C | 0.1 | — |
| 11 | — | 0.2 P | — | 0.05 |
| 12 | — | 0.2 H | — | 0.1 |
| 13 | — | 0.2 H | 0.05 | — |
| 14 | — | 0.2 H | 0.1 | — |
| 15 | — | 0.2 R | — | 0.05 |
| 16 | — | 0.2 R | — | 0.1 |
| 17 | — | 0.2 R | 0.05 | — |
| 18 | — | 0.2 R | 0.1 | — |

[a] See Table I, supra.
[b] See Table I, supra.
[c] See Table I, supra.

After preparing the gel-forming compositions, the oxygen in the air space of each vial was removed by purging the air space with nitrogen and the vials were then capped.

EXAMPLES 19–36

Gel Stability Test

Each of the gel-forming composition-containing vials prepared in Examples 1–18 was placed in an oven preheated to 300° F. The vials were periodically removed from the oven, visually rated using the system shown in the following Table III, and returned to the oven for further aging.

TABLE III

| Gel Rating Key | |
|---|---|
| 1 | No Gel |
| 2 | Weak, Non-Elastic Gel |
| 3 | Elastic Gel |
| 4 | Strong, Elastic Gel |
| 5 | Stiff Gel |
| x% | % Syneresis Water |

For example, a vial containing a gel formed from 10 ml of a gel-forming composition and having a rating of 5/90% contains about 9 ml water and about 1 ml of a stiff gel.

The results of the gel stability test are set forth below in Table IV.

TABLE IV

| | Gel Stability Test | | | | |
|---|---|---|---|---|---|
| | Gel | GEL RATING Time, days | | | |
| Ex | Time[d] | 1 | 5 | 13 | 28 |
| 1 | <1 | 4+ | 4– | 4 | 4 |
| 2[e] | <1 | 4+ | 4 | 4– | 4– |
| 9[e] | <1 | 5/80% | | | |
| 10 | <1 | 5/90% | | | |
| 3[f] | 3 | 5 | 5– | 4– | 4– |
| 11[f] | 2–3 | 5/90% | | | |
| 4 | 2 | 5 | 5 | 4+ | 5– |
| 5 | 3 | 5 | 5– | 4 | 4+ |
| 12 | 2–3 | 5/90% | | | |
| 6[g] | 3 | 5 | 4+ | 4 | 4+ |
| 13[g] | 2–3 | 5/90% | | | |
| 14 | 1 | 5/90% | | | |
| 7[h] | >99 | 2+ | 2+ | 2+ | 2 |
| 15[h] | 1 | 5/90% | | | |
| 16 | <1 | 5/90% | | | |
| 8[i] | 1 | 3– | 3– | 2+ | 2 |
| 17[i] | <1 | 5/90% | | | |
| 18 | <1 | 5/90% | | | |

[d] Hours to reach a gel rating of 3.
[e] The sole difference between the gels of Examples 2 and 9 is that the Example 2 gel contains about 2 g added potassium bicarbonate and the Example 9 gel does not contain any added potassium bicarbonate.
[f] The sole difference between the gels of Examples 3 and 11 is that the Example 3 gel contains about 2 g added potassium bicarbonate and the Example 11 gel does not contain any added potassium bicarbonate.
[g] The sole difference between the gels of Examples 6 and 13 is that the Example 6 gel contains about 2 g added potassium bicarbonate and the Example 13 gel does not contain any added potassium bicarbonate.
[h] The sole difference between the gels of Examples 7 and 15 is that the Example 7 gel contains about 2 g added potassium bicarbonate and the Example 15 gel does not contain any added potassium bicarbonate.
[i] The sole difference between the gels of Examples 8 and 17 is that the Example 8 gel contains about 2 g added potassium bicarbonate and the Example 17 gel does not contain any added potassium bicarbonate.

The data listed above in Table IV indicate that exemplary gels containing an added buffering agent degrade significantly less when aged at a temperature of about 300° F. than gels made without any added buffering agent.

EXAMPLES 37–38

Preparation of Chelating Agent-Containing Gel-Forming Compositions Within Scope of Invention A. Preparation of Stock Solutions Stock solutions (about 10 weight percent) of hydroquinone and hexamethylenetetramine were prepared in accordance with the procedure described above in section A of Examples 1–8. A polyacrylamide stock solution was prepared as described in Examples 9–18, section A, supra. The pH of the polyacrylamide stock solution was then raised from about pH 7.3 to about 8.3 using a sodium hydroxide solution (about 0.1N).

B. Preparation of Gel-forming Compositions

An aliquot (about 10 g) of the pH adjusted polyacrylamide stock solution was added to each of two vials. A chelating agent was then added to each of the vials in the amount shown in following Table V.

TABLE V

| Ex | EDTA$^j$, g | DTPA$^k$, g |
|---|---|---|
| 37 | 1.6 | — |
| 38 | — | 1.6 |

$^j$"EDTA" denotes ethylenediaminetetraacetic acid.
$^k$"DTPA" denotes diethylenetriaminepentaacetic acid.

After preparing the gel-forming compositions, the oxygen in the air space of each vial was removed by purging the air space with nitrogen and the vials were then capped.

EXAMPLES 39–42

Preparation of Chelating Agent-Containing Gel-Forming Compositions Outside Scope of Invention A. Preparation of Stock Solutions The hydroquinone, hexamethylenetetramine, and pH adjusted polyacrylamide stock solutions above in section A of Examples 37–38 were employed in Examples 39–42.

B. Preparation of Gel-forming Compositions

An aliquot (about 10 g) of the pH adjusted polyacrylamide stock solution was added to each of four vials. A chelating agent was then added to each of the vials in the amount shown in following Table VI.

TABLE VI

| Ex | EDTA, g | DTPA, g | SC$^l$, g | TETA$^m$, g |
|---|---|---|---|---|
| 39 | 0.1 | — | — | — |
| 40 | — | — | 0.1 | — |
| 41 | — | 0.1 | — | — |
| 42 | — | — | — | 0.1 |

$^l$"SC" denotes sodium citrate.
$^m$"TETA" denotes triethylenetetramine.

After preparing the gel-forming compositions, the oxygen in the air space of each vial was removed by purging the air space with nitrogen and the vials were then capped.

EXAMPLES 43–48

Gel Stability Test

Each of the gel-forming composition-containing vials prepared in Examples 37–42 was aged in accordance with the protocol stated above in Examples 19–36. The results of the gel stability test are listed in Table VII, infra.

TABLE VII

| | Gel Stability Test | | | | | | | | |
|---|---|---|---|---|---|---|---|---|---|
| | GEL RATING Time | | | | | | | | |
| | Hours | | | | | | Days | | |
| Ex | 1 | 2 | 3 | 4 | 5 | 6 | 1 | 2 | 3 |
| 37$^p$ | 2 | 3 | 4– | 4 | N/D$^n$ | N/D | 4 | 5–/NS$^o$ | 5–/NS |
| 39$^p$ | 4– | 4 | 4 | 4 | 4 | 4 | 5/80% | 5/90% | 5/95% |
| 40 | 3– | 5– | 5– | 5 | 5 | 5 | 5/40% | 5/85% | 5/95% |
| 38$^q$ | 2– | 2 | 4 | 4 | N/D | N/D | 3– | 3– | 3– |
| 41$^q$ | 3– | 5– | 5 | 5 | 5 | 5 | 5/85% | 5/90% | 5/95% |
| 42 | 4 | 5 | 5 | 5 | 5/5% | 5/5% | 5/90% | 5/80% | 5/80% |

$^n$N/D denotes not determined.
$^o$NS denotes non-sticking gel, i.e., a gel that does not adhere to the inside surface of the glass vial.
$^p$The sole difference between the gels of Examples 37 and 39 is that the Example 37 gel contains an EDTA concentration within the scope of the invention and the Example 39 gel contains an EDTA concentration below the minimum required by the invention.
$^q$The sole difference between the gels of Examples 38 and 41 is that the Example 38 gel contains a DTPA concentration within the scope of the invention and the Example 41 gel contains a DTPA concentration below the minimum required by the invention.

The data listed above in Table VII indicate that exemplary gels containing a chelating agent concentration within the scope of the invention degrade significantly less when aged at a temperature of about 300° F. than gels made with a chelating agent concentration below the minimum required by the invention.

Although the present invention has been described in considerable detail with reference to some preferred versions, other versions are possible. Therefore, the spirit and scope of the appended claims should not necessarily be limited to the description of the preferred versions contained herein.

What is claimed is:

1. A composition comprising:

(a) an ingredient selected from the group consisting of water soluble, crosslinkable polymers and polymerizable monomers capable of forming a crosslinkable polymer;

(b) a crosslinking agent comprising hexamethylenetetramine;

(c) at least about 68 weight percent water; and (d) at least 0.05 weight percent of a buffering agent having a buffering capacity at a pH greater than about 8 and being selected from the group consisting of water soluble bicarbonate salts, carbonate salts, phosphate salts, and mixtures thereof.

2. The composition of claim 1 wherein the water comprises hard water.

3. The composition of claim 1 wherein the buffering agent is selected from the group consisting of alkali metal bicarbonates, alkali metal carbonates, dibasic alkali metal phosphates, tribasic alkali metal phosphates, and mixtures thereof.

4. The composition of claim 1 wherein the buffering agent is selected from the group consisting of ammonium bicarbonate, sodium bicarbonate, potassium bicarbonate, ammonium carbonate, sodium carbonate, potassium carbonate, and mixtures thereof.

5. The composition of claim 1 comprising at least about 0.75 weight percent of the buffering agent based upon the total weight of the composition.

6. The composition of claim 1 comprising at least about 1 weight percent of the buffering agent based upon the total weight of the composition.

7. The composition of claim 1 comprising at least about 73 weight percent water.

8. The composition of claim 1 comprising at least about 78 weight percent water.

9. The composition of claim 1 comprising at least about 83 weight percent water.

10. The composition of claim 1 comprising at least about 88 weight percent water.

11. The composition of claim 1 comprising at least about 94 weight percent water.

12. The composition of claim 1 comprising about 0.001 to about 2 weight percent of the crosslinking agent.

13. The composition of claim 1 comprising about 0.001 to about 1 weight percent of the crosslinking agent.

14. The composition of claim 1 comprising about 0.001 to about 0.5 weight percent of the crosslinking agent.

15. The composition of claim 1 comprising about 0.001 to about 0.1 weight percent of the crosslinking agent.

16. The composition of claim 1 comprising at least about 73 weight percent water and about 0.001 to about 2 weight percent of the crosslinking agent.

17. The composition of claim 1 comprising about 0.1 to about 10 weight percent of the ingredient (a).

18. The composition of claim 1 comprising about 0.1 to about 5 weight percent of the ingredient (a).

19. The composition of claim 1 comprising about 0.1 to about 2.5 weight percent of the ingredient (a).

20. The composition of claim 1 comprising at least about 1.5 weight percent of the buffering agent.

21. A gel formed from the composition of claim 1.

22. A composition comprising:

(a) an ingredient selected from the group consisting of a water soluble, crosslinkable polymer selected from the group consisting of polymethacrylamides, polyacrylamides, acrylic acid-acrylamide copolymers, and acrylic acid-methacrylamide copolymers and polymerizable monomers capable of forming a crosslinkable polymer selected from the group consisting of polymethacrylamides, polyacrylamides, acrylic acid-acrylamide copolymers, and acrylic acid-methacrylamide copolymers;

(b) a crosslinking agent comprising hexamethylenetetramine;

(c) water; and (d) a stabilizing agent selected from the group consisting of buffering agents having a buffering capacity at a pH greater than about 8, chelating agents, and mixtures thereof, provided that, when the stabilizing agent comprises a buffering agent, the composition comprises at least 0.05 weight percent buffering agent; and, when the stabilizing agent comprises a chelating agent, the composition comprises at least 0.75 mole of chelating agent per mole of divalent cations dissolved in the composition.

23. The composition of claim 22 wherein the water comprises hard water.

24. The composition of claim 22 wherein the composition comprises at least about 0.8 mole of chelating agent per mole of divalent cation dissolved in the composition.

25. The composition of claim 22 wherein the water comprises hard water, the hard water having a total divalent content of at least about 100 ppmw.

26. The composition of claim 22 where the stabilizing agent comprises the buffering agent.

27. The composition of claim 22 where the stabilizing agent comprises the buffering agent and the buffering agent is selected from the group consisting of alkali metal bicarbonates, alkali metal carbonates, dibasic alkali metal phosphates, tribasic alkali metal phosphates, and mixtures thereof.

28. The composition of claim 22 where the stabilizing agent comprises the buffering agent and the buffering agent is selected from the group consisting of ammonium bicarbonate, sodium bicarbonate, potassium bicarbonate, ammonium carbonate, sodium carbonate, potassium carbonate, and mixtures thereof.

29. The composition of claim 22 comprising at least about 0.75 weight percent of the buffering agent based upon the total weight of the composition.

30. The composition of claim 22 comprising at least about 1 weight percent of the buffering agent based upon the total weight of the composition.

31. The composition of claim 22 comprising at least about 1.5 weight percent of the buffering agent.

32. The composition of claim 22 where the composition comprises at least about 0.9 mole of chelating agent per mole of divalent cation dissolved in the composition.

33. The composition of claim 22 where the composition comprises at least about 1 mole of chelating agent per mole of divalent cation dissolved in the composition.

34. A gel formed from the composition of claim 22.

35. A composition comprising:

(a) an ingredient selected from the group consisting of water soluble, crosslinkable polymers and polymerizable monomers capable of forming a crosslinkable polymer;

(b) at least about 68 weight percent water;

(c) a crosslinking agent comprising hexamethylenetetramine; and (d) a stabilizing agent selected from the group consisting of buffering agents having a buffering capacity at a pH greater than about 8, chelating agents, and mixtures thereof, provided that, when the stabilizing agent comprises a buffering agent, the composition comprises at least 0.05 weight percent buffering agent; and, when the stabilizing agent comprises a chelating agent, the composition comprises at least 0.75 mole of chelating agent per mole of divalent cations dissolved in the composition.

36. The composition of claim 35 wherein the stabilizing agent comprises the chelating agent.

37. The composition of claim 35 wherein the stabilizing agent comprises the buffering agent.

38. The composition of claim 35 wherein the water comprises hard water.

39. The composition of claim 35 comprising at least about 73 weight percent water.

40. The composition of claim 35 comprising at least about 78 weight percent water.

41. The composition of claim 35 comprising at least about 83 weight percent water.

42. The composition of claim 35 comprising at least about 88 weight percent water.

43. The composition of claim 35 comprising at least about 94 weight percent water.

44. The composition of claim 35 comprising about 0.001 to about 2 weight percent of the crosslinking agent.

45. The composition of claim 35 comprising about 0.001 to about 1 weight percent of the crosslinking agent.

46. The composition of claim 35 comprising about 0.001 to about 0.5 weight percent of the crosslinking agent.

47. The composition of claim 35 comprising about 0.001 to about 0.1 weight percent of the crosslinking agent.

48. The composition of claim 35 comprising at least about 73 weight percent water and about 0.001 to about 2 weight percent of the crosslinking agent.

49. The composition of claim 35 comprising about 0.1 to about 10 weight percent of the ingredient (a).

50. The composition of claim 35 comprising about 0.1 to about 5 weight percent of the ingredient (a).

51. The composition of claim 35 comprising about 0.1 to about 2.5 weight percent of the ingredient (a).

52. The composition of claim 35 where the composition comprises at least about 0.8 mole of chelating agent per mole of divalent cation dissolved in the composition.

53. The composition of claim 35 where the composition comprises at least about 0.9 mole of chelating agent per mole of divalent cation dissolved in the composition.

54. The composition of claim 35 where the composition comprises at least about 1 mole of chelating agent per mole of divalent cation dissolved in the composition.

55. The composition of claim 35 comprising at least about 0.75 weight percent of the buffering agent.

56. The composition of claim 35 comprising at least about 1 weight percent of the buffering agent.

57. The composition of claim 35 comprising at least about 1.5 weight percent of the buffering agent.

58. A gel formed from the composition of claim 35.

* * * * *